(12) United States Patent
Cannata

(10) Patent No.: US 7,762,066 B2
(45) Date of Patent: Jul. 27, 2010

(54) REGENERATION SYSTEM

(75) Inventor: Antonio Cannata, London (CA)

(73) Assignee: Tonand Brakes, Inc., London, ON (CA)

( * ) Notice: Subject to any disclaimer, the term of this patent is extended or adjusted under 35 U.S.C. 154(b) by 365 days.

(21) Appl. No.: 12/019,616

(22) Filed: Jan. 24, 2008

(65) Prior Publication Data

US 2009/0188249 A1 Jul. 30, 2009

(51) Int. Cl.
*B60K 6/12* (2006.01)
*B60L 17/356* (2006.01)

(52) U.S. Cl. .................................. 60/414; 123/48 B

(58) Field of Classification Search .................. 60/413, 60/414, 416, 418; 123/48 B
See application file for complete search history.

(56) References Cited

U.S. PATENT DOCUMENTS

| 3,803,835 | A | * | 4/1974  | Rodov ......................... 60/414 |
| 4,140,091 | A |   | 2/1979  | Showers |
| 4,227,587 | A |   | 10/1980 | Carman |
| 4,864,977 | A |   | 9/1989  | Hasegawa |
| 5,261,797 | A | * | 11/1993 | Christenson ................. 417/380 |
| 6,622,672 | B1|   | 9/2003  | Styron et al. |
| 6,719,080 | B1|   | 4/2004  | Gray |
| 7,011,051 | B2| * | 3/2006  | Epshteyn .................. 123/46 R |
| 7,273,122 | B2|   | 9/2007  | Rose |

* cited by examiner

*Primary Examiner*—Thomas E Lazo
(74) *Attorney, Agent, or Firm*—Mark Sprigings; Gowling, Lafleur & Henderson

(57) ABSTRACT

A regeneration system for use in a vehicle having a reciprocating-piston engine. The regeneration system captures energy (e.g. braking energy), stores the energy, and subsequently uses the stored energy to generate motive power for the vehicle. The motive power can be generated in conjunction with motive power provided by the engine. The regeneration system comprises a variable displacement pump/motor that is connected to a connecting rod in each cylinder of the engine. The pump/motor comprises a fluid chamber, a primary piston mechanically coupled to the connecting rod and a slave piston coupled to the primary piston via resilient means. A control unit controls a plurality of valves to direct the exchange of pressurized hydraulic fluid between the pump/motor and a hydraulic accumulator in synchronous timing with the operation of the engine.

2 Claims, 4 Drawing Sheets

REGENERATION SYSTEM

CROSS-REFERENCE TO RELATED APPLICATIONS

This application claims priority from U.S. Provisional patent application Ser. No. 11/626,497, filed Jan. 24, 2007, the entirety of which is incorporated herein by reference.

FIELD OF THE INVENTION

The present invention relates to the field of energy recovery systems. In particular, to a regeneration system for use with a reciprocating-piston engine.

BACKGROUND

With the growing concerns over environmental impacts and the every increasing cost of energy products, both producers and consumers of internal combustion engines are interested in means to improve the operational efficiency of these engines. One area receiving considerable attention is the use of energy recovery systems in road vehicles, commonly referred to as hybrids vehicles. These systems have mechanisms for capturing energy during braking, storing the captured energy and later consuming the energy to provide motive power to the vehicle. Typically these systems use a single electrical generator/motor or a single hydraulic pump/motor for capturing the energy and for providing motive power from the captured energy. The generator/motor or pump/motor is typically coupled to the drive-train of the vehicle via a transmission (e.g. a continuously variable transmission) or gear system (e.g. a planetary gear set) that is downstream from the prime mover (e.g. internal combustion engine). Motive power can be provided by the generator/motor or pump/motor in conjunction with motive power provided by the prime mover. When a multi-cylinder reciprocating-piston engine is used as the prime mover, the engine typically generates motive power that includes power pulses that correspond to the power generation sequence of the individual cylinders in the engine. The motive power provided by the generator/motor or pump/motor is not typically synchronized to the power pulses of the internal combustion engine and therefore does not contribute to smoothing out (i.e. mitigating) the power pulses. In some instances (especially in the case of a reciprocating pump/motor) additional asynchronous power pulses may be added to the total motive power flow.

What is needed is an energy recovery (i.e. regeneration) system for use with a reciprocating-piston engine that can provide motive power in a way that mitigates the power pulses intrinsic to the output of the engine.

SUMMARY OF INVENTION

A regeneration system for use in a vehicle having a reciprocating-piston engine. The regeneration system captures energy (e.g. braking energy), stores the energy, and subsequently uses the stored energy to generate motive power for the vehicle. The motive power can be generated in conjunction with motive power provided by the engine. The regeneration system comprises a pump/motor that is connected to a connecting rod in each cylinder of the engine. The pump/motor comprises a fluid chamber, a primary piston mechanically coupled to the connecting rod and a slave piston coupled to the primary piston via resilient means. The primary and slave pistons reciprocate in the fluid chamber responsive to the movement of the connecting rod and to the injection and discharge of hydraulic fluid to and from the fluid chamber (i.e. the pump/motor). A control unit controls a plurality of valves to direct the exchange of pressurized hydraulic fluid between the pump/motor and a hydraulic accumulator in synchronous timing with the operation of the engine.

In accordance with one aspect of the present invention, there is provided a regeneration system for use with a reciprocating-piston engine having at least one combustion cylinder in which a piston, connected to a crankshaft by a connect rod, reciprocates, the regeneration system comprising: a hydraulic pump/motor, a source of hydraulic fluid, a three-way control valve, a sink for hydraulic fluid, a pressure control valve, a hydraulic accumulator and a control unit. The hydraulic pump/motor having: a hydraulic chamber; a primary piston for reciprocation in the hydraulic chamber and mechanically coupled to the connect rod; a slave piston for reciprocation in the hydraulic chamber; a resilient mechanism for coupling the slave piston to the primary piston and for providing, in conjunction with the slave piston, variable displacement operation of the pump/motor; and a inlet/outlet port for admitting and expelling hydraulic fluid to and from the hydraulic chamber; wherein the pump/motor is operable in a pump mode for converting power received from the connecting rod to pressurized hydraulic fluid expelled from the hydraulic chamber, and in a motor mode for converting pressurized hydraulic fluid admitted into the hydraulic chamber to motive power transferred to the connecting rod. The source of hydraulic fluid, in fluid communication with the inlet/outlet port via a check valve, for supplying hydraulic fluid to the pump/motor, when operating in pump mode, responsive to an injection control signal. The three-way control valve having a first port, a second port and a third port, the three-way control valve operable, responsive to a position control signal, between a first position in which the first port is in fluid communication with the second port, a second position in which the first port is in fluid communication with the third port, and a third position in which none of the first, second and third ports is in fluid with any other of the first, second and third ports, and wherein the first port is in fluid communication with the inlet/outlet port. The sink, in fluid communication with the inlet/outlet port via the third port of the three-way valve, for receiving hydraulic fluid from the pump/motor, when operating in motor mode, responsive to a dump control signal. The pressure control valve, having an inlet port in fluid communication with the third port of the three-way valve and an outlet port, for varying the resistance to hydraulic flow between the inlet port and the outlet port responsive to a pressure control signal. The hydraulic accumulator, in fluid communication with the second port of the three-way control valve, for supplying pressurized hydraulic fluid to the pump/motor when operating in motor mode, and in fluid communication with the third port of the three-way valve via the outlet port of the pressure control valve for receiving pressurized hydraulic fluid from the pump/motor when operating in pump mode. The control unit for receiving a crankshaft position signal and an accumulator pressure signal, and for generating the injection control signal, the position control signal, the dump control signal and the pressure control signal in accordance the operating mode of the pump/motor, a desired degree of brake force and a desired degree of motive power generation and with timing of the control signals derived from the crankshaft position. Wherein pressurized hydraulic fluid derived from engine power in the pump/motor, operating in pump mode, is received by and stored in the hydraulic accumulator, and motive power derived form pressurized hydraulic fluid, received from the hydraulic accumulator, in the pump/motor, operating in the motor mode, is transferred to the crankshaft.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
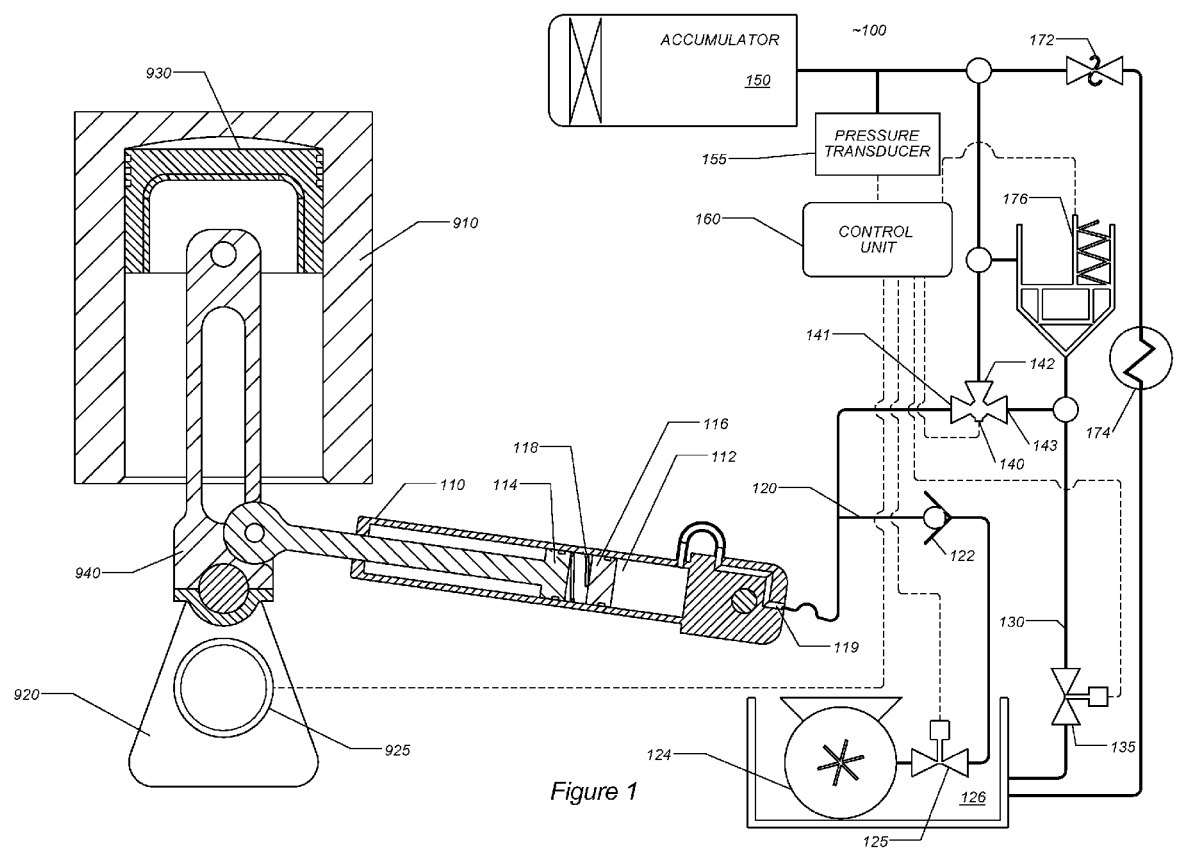
FIG. 1 is a schematic representation of an exemplary embodiment of a regeneration system for use with a reciprocating-piston engine.

FIG. 1 is a schematic representation of an exemplary embodiment of a regeneration system 100 for use with a reciprocating-piston engine. The internal combustion engine has at least one combustion cylinder 910 and a crankshaft 920 for converting the reciprocating motion of an engine piston 930 to rotational motion. The engine piston 930 is connected to the crankshaft 920 by a connecting rod 940. The internal combustion engine can be any of the well known reciprocating piston type engines operating in a four-stroke or a two-stroke mode of operation. The regeneration system 100 is described herein with reference to a four-stoke, spark ignition (i.e. Otto cycle) engine but is equally applicable to other well known reciprocating piston engine types. The regeneration system 100 comprises a hydraulic pump/motor 110, a source 120 for supplying hydraulic fluid, a sink 130 for receiving hydraulic fluid, a three-way control valve 140, a hydraulic accumulator 150 and a control unit 160.

Figure 4:
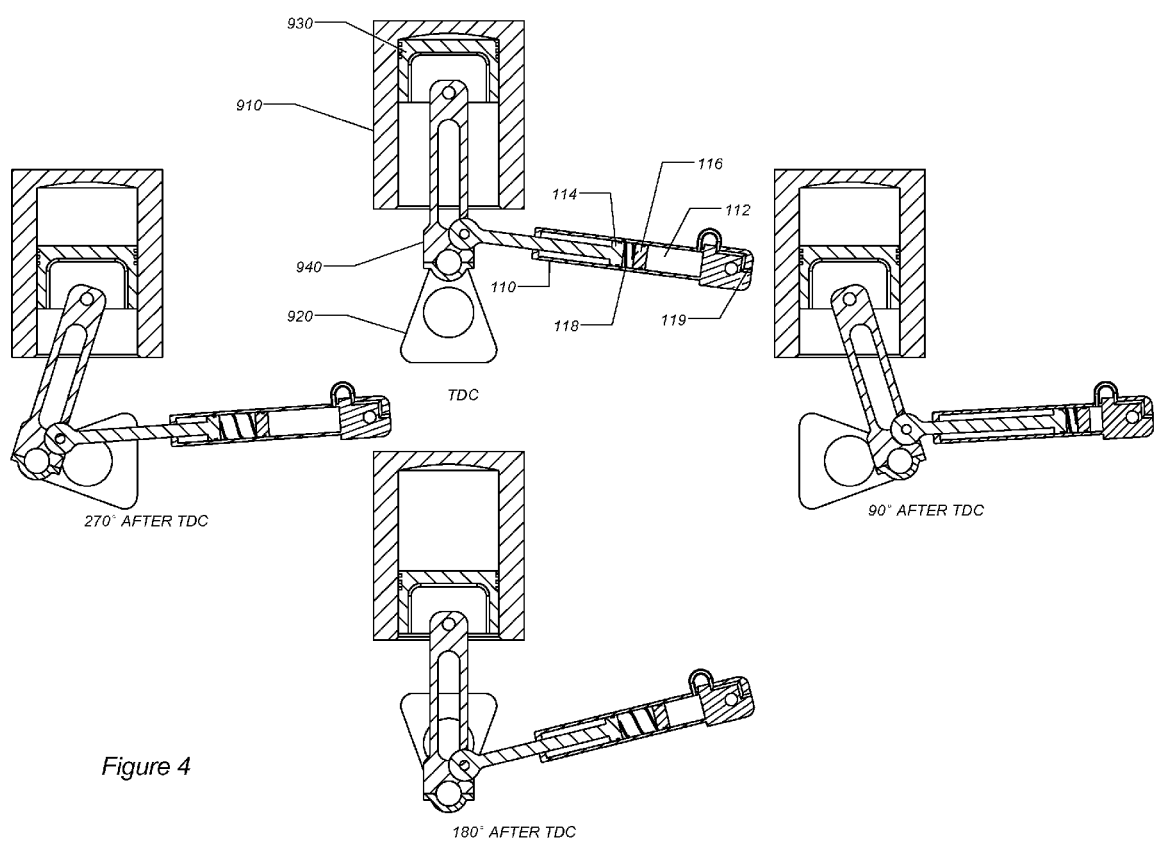
FIG. 4 is a schematic representation of the position and extension of a hydraulic pump/motor at four illustrative points in the rotation of a crankshaft.

The pump/motor 110 is pivotally connected to the connecting rod 940 at a first end and to a point that is stationary relative to the rotational center of the crankshaft 920 at a second end. The connection points of the pump/motor 110 are arranged so that the pump/motor 110 cycles through one intake stroke and one discharge stroke for one complete rotation (i.e. revolution) of the crankshaft 920. FIG. 4 is a schematic representation of the position and extension of the pump/motor 110 at four illustrative points in the rotation of the crankshaft 920. Referring again to FIG. 1, the pump/motor 110 has a hydraulic chamber 112 in which a primary piston 114 reciprocates. The primary piston 114 is mechanically connected to the connecting rod 940 so that the primary piston 114 reciprocates in the hydraulic chamber 112 responsive to rotation of the crankshaft 920. A slave piston 116 is also contained for reciprocation in the hydraulic chamber 112. The slave piston 116 is coupled to the primary piston 114 by a resilient mechanism 118 such as, for example, a spring. The resilient mechanism 118 is a progressive rate device for which the pressure required to compress the resilient mechanism 118 increases as the resilient mechanism 118 is further compressed. The slave piston 116 in conjunction with the resilient mechanism 118 provide for the pump/motor 110 to operate as a variable displacement device. The pump/motor 110 has an inlet/outlet port 119 for admitting and expelling hydraulic fluid to and from the hydraulic chamber 112. The pump/motor 110 can be operated alternatively in a pump mode and in a motor mode.

The source 120 of hydraulic fluid comprises a pump 124 such as, for example, a lubricating pump for the engine, connected to a reservoir 126 of hydraulic fluid such as, for example, the engine oil pan (i.e. sump). The pump 124 outputs hydraulic fluid of sufficient pressure to overcome (i.e. compress) the resilient mechanism 118 in the hydraulic chamber 112. In an alternative embodiment any other well known similar source of pressurized fluid can be used. The source 120 of pressurized hydraulic fluid further comprises an injection check valve 122 and an injection control valve 125. The injection check valve 122 permits the flow of pressurized hydraulic fluid from the pump 124 to the pump/motor 110 and prevents flow in the opposite direction. The source 120 of hydraulic fluid is connected in fluid communication with the inlet/outlet port 119 for supplying hydraulic fluid to the pump/motor 110, operating in pump mode, via the injection control valve 125. The injection control valve 125 is operable between a closed position blocking fluid flow-through and an open position permitting fluid flow-through responsive to an injection control signal from the control unit 160. The volume of hydraulic fluid injected into the pump/motor 110 can be regulated by the timing (relative to the rotational position of the crankshaft) and duration (e.g. a modulation pulse width) of opening of the injection control valve 125. The volume of injected hydraulic fluid can be varied from none (i.e. no fluid) to the maximum volume of the hydraulic cylinder 112. In an alternative embodiment (not illustrated) the injection control valve 125 can be pressure control type valve that, responsive to the injection control signal, controls the flow of hydraulic fluid by regulating a pressure differential between an inlet side (i.e. from the dump 124) and an outlet side (i.e. toward the inlet/outlet port 119) of the injection control valve 125.

The sink 130 for pressurized hydraulic fluid comprises a reservoir 126 for hydraulic fluid such as, for example, the engine oil pan (i.e. sump) and a dump valve 135 that alternately permits the flow of pressurized hydraulic fluid toward the reservoir 126 responsive to a dump control signal from the control unit 160 and blocks the flow of pressurized hydraulic fluid toward the reservoir 126. The sink 130 for receiving hydraulic fluid is connected, via the three-way control valve 140, in fluid communication with the inlet/outlet port 119 for receiving hydraulic fluid from the pump/motor 110 when operating in motor mode.

The three-way control valve 140 comprises a first port 141, a second port 142 and a third port 143. The three-way control valve 140 is operable between a first position in which the first port 141 is in fluid communication with the second port 142, a second position in which the first port 141 is in fluid communication with the third port 143 and a third position in which none of the ports 141, 142, 143 is in fluid communication with any other of the ports 141, 142, 143 (i.e. fluid flow through the three-way valve 140 is blocked). The first port 141 is connected in fluid communication with the inlet/outlet port 119 of the pump/motor 110 and the third port 143 is connected in fluid communication with the sink 130.

The hydraulic accumulator 150 is connected in fluid communication with the second port 142 of the three-way control valve 140 for supplying pressurized hydraulic fluid to the pump/motor 110 when operating in motor mode. The hydraulic accumulator 150 is connected in fluid communication with the third port 143 of the three-way control valve 140 via a pressure control valve 176 for receiving pressurized hydraulic fluid from the pump/motor 110 when operating in pump mode.

The control unit 160 provides for controlling the injection control valve 125, the three-way control valve 140, the pressure control valve 176 and the dump valve 135 in accordance the operating mode of the pump/motor (i.e. pump mode or motor mode), a desired degree of brake force and a desired degree of motive power generation. The three-way control valve 140 can be operated into any of the first position, the second position and the third position, as described above with reference to FIG. 1, responsive to a position control signal from the control unit 160. The control unit 160 receives a signal from a crankshaft position sensor 925 from which the rotational position of the crankshaft 920 can be derived. The position of the combustion piston 930 can be derived from a pre-determined relationship between the combustion cylinder 910 and the crankshaft 920. The position of the primary piston 114 can be derived from a pre-determined relationship between the primary piston 114 and the connecting rod 940. The control unit 160 further receives a pressure signal from a pressure transducer 155 in fluid communication with the accumulator 150.

Referring to the exemplary embodiment of FIGS. 1 and 4, as the crankshaft 920 rotates and the engine piston 930 reciprocates, the primary piston 114 of the pump/motor 110 also reciprocates in the hydraulic chamber 112. The connection of the pump/motor 110 to the connecting rod 940 is arranged so that the hydraulic chamber 112 volume is minimized when the engine piston 930 is proximate 90 degrees after its top-dead-center (TDC) position in the combustion cylinder 910. The TDC position corresponds to the 0 (zero) degree and the 360 degree positions for the purposes of this document. The hydraulic chamber 112 volume is maximized when the engine piston 930 is proximate 270 degrees after the TDC position.

In an alternative embodiment (not illustrated) the connection of the pump/motor 110 to the connecting rod 114 can be arranged so that the hydraulic chamber 112 volume is minimized when the engine piston 112 is proximate another pre-determined rotational position (e.g. any position between 0-180 degrees relative to TDC) and the hydraulic chamber 112 volume is maximized at a position 180 degree after the predetermined rotational position. The alternative embodiment will function substantially as described in this document with reference to the preferred embodiment except that the timing relationships are adjusted accordingly.

When the pump/motor 110 is operating in pump mode, hydraulic fluid is pressurized in the pump/motor 110 and then is subsequently transferred to the hydraulic accumulator 150 (i.e. the regeneration system 100 is storing energy). Hydraulic fluid from the source 120 is injected into hydraulic chamber 112 via inlet/outlet port 119 as the engine piston 930 moves between a minimum hydraulic chamber 112 volume position and a maximum hydraulic chamber 112 volume position (e.g. proximately 90 degrees to 270 degrees after TDC). The volume of hydraulic fluid injected into the hydraulic chamber 112 is regulated by the timing and duration of opening of the injection control valve 125 responsive to the injection control signal received from the control unit 160. The volume of injected hydraulic fluid can be varied from none (i.e. no fluid) to the maximum volume of the hydraulic cylinder 112. The injected hydraulic fluid is of sufficient pressure to overcome the resilient mechanism 118. The slave piston 116 in conjunction with the resilient mechanism 118 compensate for any difference between the volume of injected hydraulic fluid and the increasing volume of the hydraulic chamber 112. Hydraulic fluid is expelled from the hydraulic chamber 112 via inlet/outlet port 119 as the engine piston 930 moves between the maximum hydraulic chamber 112 volume position and the minimum hydraulic chamber 112 volume position (e.g. proximately 270 degrees after TDC, through TDC, to 90 degrees after TDC). The hydraulic fluid is directed to the hydraulic accumulator 150 via the three-way valve 140 operated into the second position in which the first port 141 and third port 143 are in fluid communication. The pressure control valve 176 is hydraulically connected between the three-way valve 140 and the hydraulic accumulator 150. Responsive to a pressure control signal from the control unit 160, the pressure control valve 176 regulates a pressure differential between an inlet side (i.e. from the pump/motor 110) and an outlet side (i.e. toward the accumulator 150). The pressure control valve 176 can vary the resistance to fluid flow from the inlet side to the outlet side. The resistance to fluid flow generated by the pressure control valve 176 can create a back-pressure on the pump/motor 110 inlet/outlet port 119. The degree of backpressure on the pump/motor 110 regulates a brake effect created by the pump/motor 110 in pumping mode. The braking effect in the pump/motor 110 is imparted to the crankshaft 920 thereby creating engine braking. Pressurized hydraulic fluid flowing through the pressure control valve 176 is stored in the accumulator 150.

A pressure relief valve 172 is also connected to the hydraulic accumulator 150. The pressure relief valve 172 opens when a pre-determined pressure threshold is exceeded to release hydraulic fluid and pressure from the hydraulic accumulator 150 toward the reservoir 126, via an optional heat sink 174, to prevent over pressurization of the accumulator 150.

The amount of energy extracted from the internal combustion engine is proportional to the volume of hydraulic fluid expelled from the pump/motor 110 when operating in pump mode. A smaller volume expelled corresponds to less energy extracted and a larger volume expelled corresponds to more energy extracted. The volume of fluid expelled is substantially equal to the volume of fluid injected. When it is desirable to minimize any parasitic load on the internal combustion engine caused by the regeneration system 100, no fluid is injected in pump mode and therefore no energy is extracted.

When the pump/motor 110 is operating in motor mode, hydraulic fluid in the hydraulic accumulator 150 is transferred to the pump/motor 110 to provide power to be imparted to the crankshaft 920 via the connecting rod 940 (i.e. the regeneration system 100 is converting stored energy to motive power). Hydraulic fluid from the hydraulic accumulator 150 is injected into hydraulic chamber 112 via the inlet/outlet port 119 as the engine piston 930 moves between the minimum hydraulic chamber 112 volume position and the maximum hydraulic chamber 112 volume position (e.g. proximately 90 degrees to 270 degrees after TDC). The injection of hydraulic fluid is regulated using the three-way valve 140 operated into the first position in which the first port 141 and second port 142 are in fluid communication. The volume of hydraulic fluid injected into the hydraulic chamber 112 is regulated by the timing (relative to the rotational position of the crankshaft) and duration (e.g. a pulse width modulated duration) of operating the three-way control valve 140 into the first position responsive to a position control signal received from the control unit 160. The volume of injected hydraulic fluid can be varied from none (i.e. no fluid) to the maximum volume of the hydraulic cylinder 112. The injected hydraulic fluid is of sufficient pressure to overcome the resilient mechanism 118. The slave piston 116 in conjunction with the resilient mechanism 118 compensates for any difference between the volume of injected hydraulic fluid and the increasing volume of the hydraulic chamber 112. Hydraulic fluid is expelled from the hydraulic chamber 112 via inlet/outlet port 119 as the engine piston 930 moves between the maximum hydraulic chamber 112 volume position and the minimum hydraulic chamber 112 volume position (e.g. proximately 270 degrees after TDC, through TDC, to 90 degrees after TDC). The hydraulic fluid is directed toward the sink 130 via the three-way valve 140 operated into the second position in which the first port 141 and third port 143 are in fluid communication. The dump valve 135 is opened responsive to a dump control signal from the control unit 160 to provide a fluid path to the reservoir 126 and thereby minimize backpressure on the hydraulic fluid being expelled from the pump/motor 110. The volume of hydraulic fluid injected into the pump/motor 110 regulates a motive power generated by the pump/motor 110 in motor mode. The motive power generated by the pump/motor 110 is imparted to the crankshaft 920 thereby adding to the motive power generated by the engine.

Figure 2:
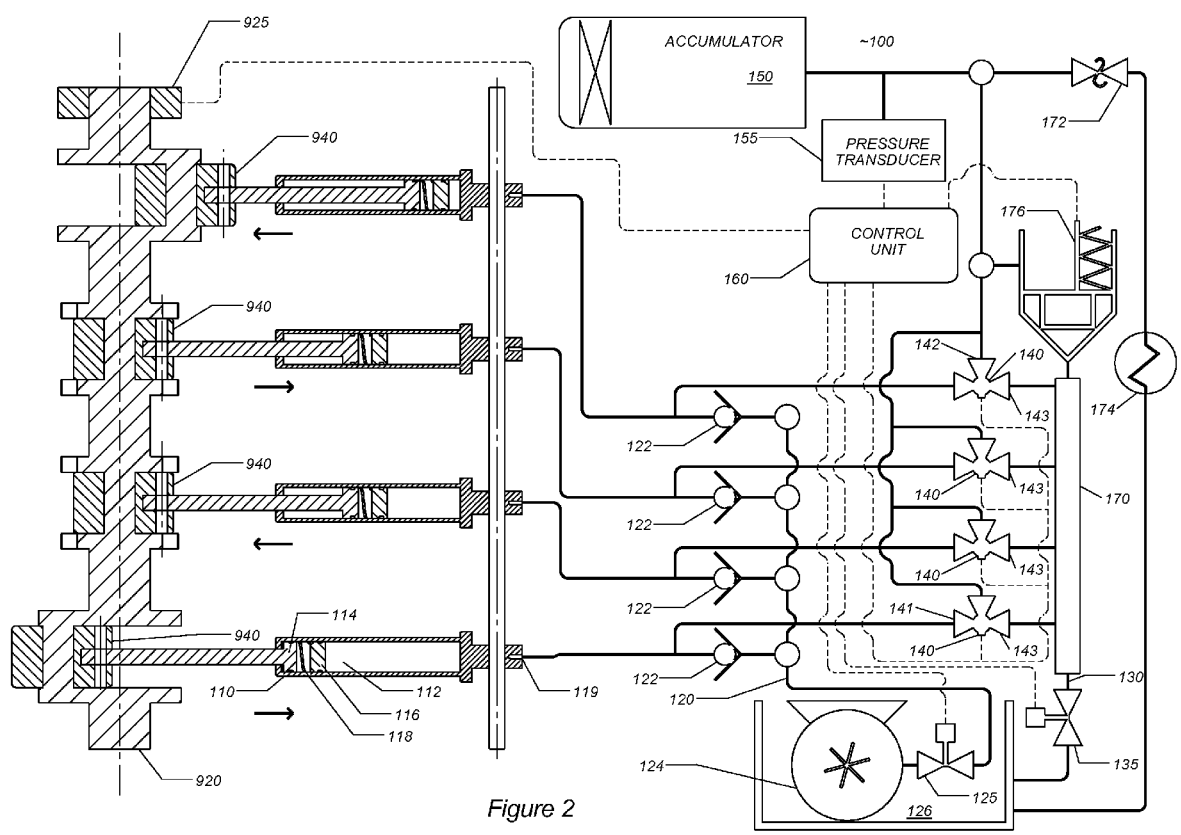
FIG. 2 is a schematic representation of an alternative exemplary embodiment of the regeneration system for use with a reciprocating-piston engine.

FIG. 2 is a schematic representation of an alternative exemplary embodiment of the regeneration system 100 for use with an exemplary internal combustion engine having four combustion cylinders. Operation of each of the components comprising the regeneration system 100 is substantially the same as for the corresponding component described above with reference to FIG. 1 except as noted below. For clarity, only the connecting rods 940 of each of the four combustion cylinders are illustrated. Each of the four connecting rods 940 (i.e. combustion cylinders) has a corresponding a separate pump/motor 110. The pump/motor 110 for each combustion cylinder 910 has an associated check valve 122. The pump 124, injection control valve 125, and reservoir 126 for hydraulic fluid are common and shared by all of pump/motors 110. Each pump/motor 110 is in hydraulic communication with a separate three-way control valve 140. A hydraulic gallery 170 (i.e. manifold) interconnects the third port 143 of each of three-way control valves 140. The dump control valve 135, the pressure control valve 176, the accumulator 150, the pressure transducer 155, the control unit 160, the pressure relief valve 172, and the heat sink 174 are common and shared by all of combustion cylinders. The combustion cylinders are rotationally spaced apart with respect to their connection to the crankshaft to provide a predetermined firing order (i.e. ignition sequence). Each of the pump/motors 110 is in a fixed timing relationship with a corresponding combustion cylinder. The control unit 160 times (relative to the rotational position of the crankshaft) the operation of the injection control valve 125, the pressure control valve 176, the dump valve 135, and each of the three-way valves 140 based on the predetermined firing order and the derived crankshaft position in order to synchronize control of each of the pump/motors 110 with the corresponding combustion cylinder. For example, when operating in motor mode the injection of fluid into each pump/motor 110 can be timed to coincide with an intake stroke of the corresponding combustion cylinder thereby complimenting power pulses generated in power strokes of the corresponding combustion cylinder. In FIG. 2, each of the pump/motors 110 is illustrated with a volume of hydraulic fluid injected into each hydraulic cylinder 112 less than the maximum volume of the hydraulic cylinder 112. The arrows adjacent to the connecting rods 940 indicate the direction of travel of the primary piston 114 in the corresponding pump/motor 110.

Figure 3:
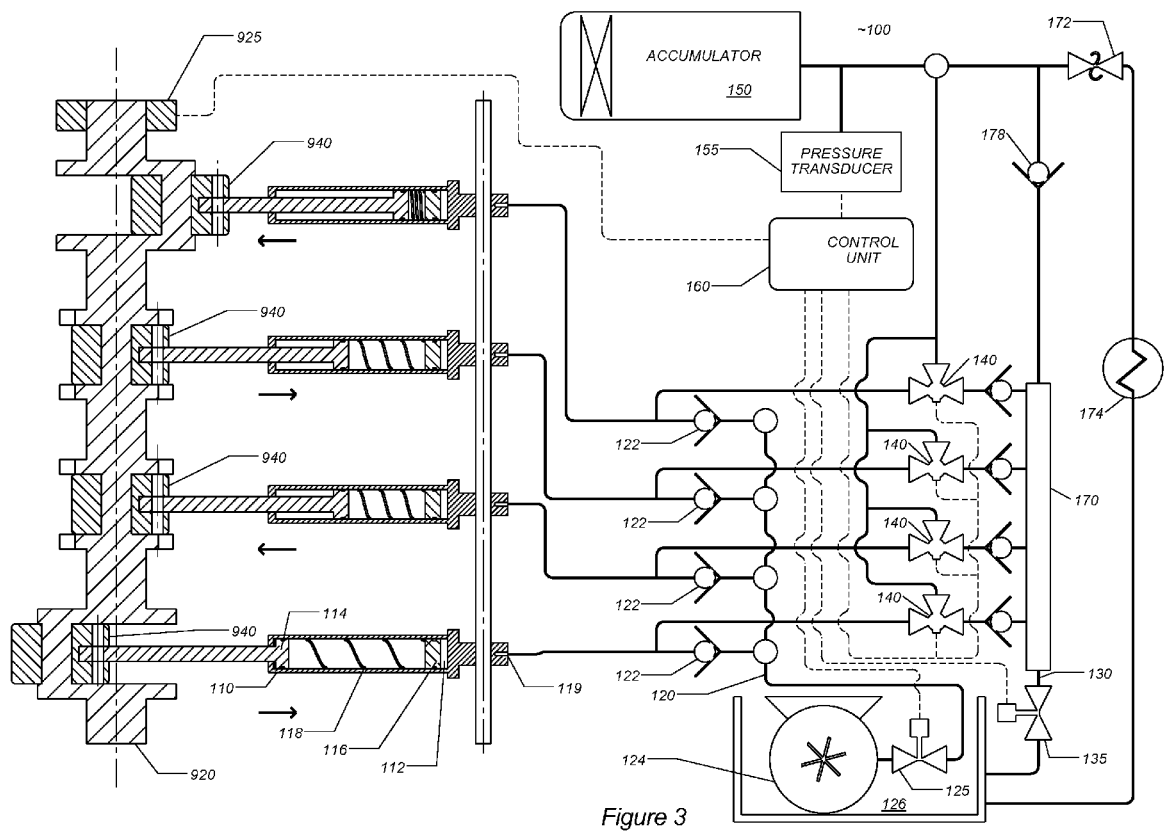
FIG. 3 is a schematic representation of another alternative exemplary embodiment of the regeneration system for use with a reciprocating-piston engine.

FIG. 3 is a schematic representation of an alternative exemplary embodiment of the regeneration system 100 for use with an exemplary internal combustion engine having four combustion cylinders. The regeneration system of FIG. 3 is similar to and operates in substantially the same way as the regeneration system 100 described above with reference to FIG. 2 with the following exceptions. The regeneration system 100 does not comprise the pressure control valve 176, instead a discharge check valve 178 is in fluid communication between the hydraulic gallery 170 and the accumulator 150 for permitting the transfer of pressurized hydraulic fluid to the accumulator 150 and for preventing flow in the opposite direction. The degree of backpressure applied to the pump/motor 110 in pumping mode is not regulated by the control unit 160, instead it is a function of the pressure in the accumulator 150. In FIG. 3, each of the pump/motors 110 is illustrated with a zero volume of hydraulic fluid (i.e. no fluid) injected into each hydraulic cylinder 112. The arrows adjacent to the connecting rods 940 indicate the direction of travel of the primary piston 114 in the corresponding pump/motor 110.

In a further alternative embodiment the regeneration system 100 can be used with a reciprocating-piston engine having one or more combustion cylinders 930 and operating substantially as described above with reference to FIGS. 1-4.

It will be apparent to one skilled in the art that numerous modifications and departures from the specific embodiments described herein may be made without departing from the spirit and scope of the present invention.

The invention claimed is:

1. A regeneration system for use with a reciprocating-piston engine having at least one combustion cylinder in which a piston, connected to a crankshaft by a connect rod, reciprocates, the regeneration system comprising:
   a hydraulic pump/motor having:
      a hydraulic chamber;
      a primary piston for reciprocation in the hydraulic chamber and mechanically coupled to the connect rod;
      a slave piston for reciprocation in the hydraulic chamber;
      a resilient mechanism for coupling the slave piston to the primary piston and for providing, in conjunction with the slave piston, variable displacement operation of the pump/motor; and
      a inlet/outlet port for admitting and expelling hydraulic fluid to and from the hydraulic chamber;
      wherein the pump/motor is operable in a pump mode for converting power received from the connecting rod to pressurized hydraulic fluid expelled from the hydraulic chamber, and in a motor mode for converting pressurized hydraulic fluid admitted into the hydraulic chamber to motive power transferred to the connecting rod;
   a source of hydraulic fluid, in fluid communication with the inlet/outlet port via a check valve, for supplying hydraulic fluid to the pump/motor, when operating in pump mode, responsive to an injection control signal;
   a three-way control valve having a first port, a second port and a third port, the three-way control valve operable, responsive to a position control signal, between a first position in which the first port is in fluid communication with the second port, a second position in which the first port is in fluid communication with the third port, and a third position in which none of the first, second and third ports is in fluid with any other of the first, second and third ports, and wherein the first port is in fluid communication with the inlet/outlet port;
   a sink, in fluid communication with the inlet/outlet port via the third port of the three-way valve, for receiving hydraulic fluid from the pump/motor, when operating in motor mode, responsive to a dump control signal;

a pressure control valve, having an inlet port in fluid communication with the third port of the three-way valve and an outlet port, for varying the resistance to hydraulic flow between the inlet port and the outlet port responsive to a pressure control signal;

a hydraulic accumulator, in fluid communication with the second port of the three-way control valve, for supplying pressurized hydraulic fluid to the pump/motor when operating in motor mode, and in fluid communication with the third port of the three-way valve via the outlet port of the pressure control valve for receiving pressurized hydraulic fluid from the pump/motor when operating in pump mode; and a control unit for receiving a crankshaft position signal and an accumulator pressure signal, and for generating the injection control signal, the position control signal, the dump control signal and the pressure control signal in accordance the operating mode of the pump/motor, a desired degree of brake force and a desired degree of motive power generation and with timing of the control signals derived from the crankshaft position;

wherein pressurized hydraulic fluid derived from engine power in the pump/motor, operating in pump mode, is received by and stored in the hydraulic accumulator, and motive power derived from pressurized hydraulic fluid, received from the hydraulic accumulator, in the pump/motor, operating in the motor mode, is transferred to the crankshaft.

2. The regeneration system of claim 1, wherein the reciprocating-piston engine has a plurality of combustion cylinders each connected by a corresponding connecting rod to the crankshaft, the regeneration system further comprising:

a plurality of pump/motors each one connected to a separate connecting rod and wherein the source is in fluid communication with the inlet/outlet port of each pump/motor via a separate check valve;

a plurality of three-way valves, the first port of each three-way valve in fluid communication with a different one of the plurality of pump/motors;

the control unit further for generating a separate position control signal for each of the plurality of three-way valves and for generating the injection control signal, the dump control signal and the pressure control signal in accordance with each of the plurality of combustions cylinders.

* * * * *